United States Patent [19]

Otte

[11] 4,102,791
[45] Jul. 25, 1978

[54] DOUBLE DRUM VACUUM FILTER

[75] Inventor: Wilhelm Otte, Bochum, Germany

[73] Assignee: Klöckner-Humboldt-Deutz Aktiengesellschaft, Germany

[21] Appl. No.: 730,679

[22] Filed: Oct. 7, 1976

[30] Foreign Application Priority Data

Oct. 8, 1975 [DE] Fed. Rep. of Germany ....... 2545030

[51] Int. Cl.² ............................................. B01D 33/06
[52] U.S. Cl. .................................................. 210/326
[58] Field of Search ............................... 210/402–404, 210/217, 326; 209/288, 289

[56] References Cited

U.S. PATENT DOCUMENTS

| 2,403,021 | 7/1946 | Peterson et al. | 210/404 X |
| 2,499,412 | 3/1950 | Peterson | 210/402 X |
| 2,602,549 | 7/1952 | Peterson | 210/402 X |
| 2,751,086 | 6/1956 | Borjeson | 210/402 X |

Primary Examiner—William A. Cuchlinski, Jr.
Attorney, Agent, or Firm—Hill, Gross, Simpson, Van Santen, Steadman, Chiara & Simpson

[57] ABSTRACT

A double drum filter of the vacuum type which includes a pair of oppositely rotating foraminous surfaced drums having their foraminous surfaces in substantially abutting contact, the faces of the drums being connected to one another by means of baffle plates. The baffle plates preferably include sealing elements which abut the overflow edges of the faces. Other improvements include the combination of filter cake removal devices and cleansing nozzles which are positioned about the foraminous periphery of the drum in offset relation.

1 Claim, 3 Drawing Figures

DOUBLE DRUM VACUUM FILTER

BACKGROUND OF THE INVENTION

1. Field of the Invention

The invention relates to a double drum filter, particularly vacuum filter with oppositely rotating drums for the filtration of suspensions containing solids.

2. Description of the Prior Art

In the field of filter technique, there is described in the German Laid Open No. 2,322,155 a double drum filter for the dehydration of fibrous constituents in a suspension, for example, paper pulp, in which two rotatably positioned and oppositely driven drums are arranged with parallel axes in a closed pressure tank and form between them a roller gap or clearance. The drum-shaped filters in this connection assume both the function of the dehydration of the paper pulp as well as also the transportation of the dehydrated fibrous and conherent filter cake. The drums with parallel axes arranged adjacent one another act in this connection as in the case of a stand of rolls. The material rising high from the roller gap and dehydrated, reaches a removal apparatus arranged vertically above the roller gap. Filters of this type of construction are, however, not adapted for the filtration of suspensions containing finely granular solid substances, such as coal sludge, flotation concentrates, etc.

For the filtration of suspensions containing solid substances with double drum filters it is on the other hand suggested to carry out the filter charge from above in the center between both filter drums and to bridge over the roller gap with a stationary trough-floor or -bottom which is arranged on the drum-stand. For the sealing of the trough with respect to the rotating drums, expensive sealing elements, such as gummed sealing strips had to be provided. The sealing on the filter surface by means of sealing strips has the disadvantage, that the sealing strips, on the one hand, are subject to a high wear, and on the other hand, cause a high wear of the filter-tissue.

Such a type of construction, after brief time in operation, leads to a high amount of dripping water, so that the filter must be put out of operation. For the filtration of finely granular, wearing solid substances in a suspension, such as flotation concentrates or coal sludges these filters are not adapted and were for the above reasons not engaged in.

SUMMARY OF THE INVENTION

It is the object of the present invention to furnish a double drum filter for the filtration of suspensions, which on account of coarse and rapidly sinking solid substances are inclined to separations or decompositions. Such a filter should be distinguished by high output through a simple construction and low degree of wear, through impenetrable seals and through protection of the filter tissue by means of the least possible frictional surfaces.

This object is solved according to the invention thereby that the filter drums are in effective connection directly through their sleeve surfaces, and that the front sides of the drums are connected with one another through baffle plates. By means of this measure, in simple manner, a suspension tank is formed, in which the previously used scraping seals on the drum sleeve surfaces are prevented, which formerly after short time led to leakages or permeabilities or smudged the filter surface. With the measures according to the invention, to the contrary, after each suspension, on the one hand, a hobbing of the drums takes place along a line of contact, on the other hand, a contactless contact results, so that no wear and no smudging of the filter tissue can occur. Solely the sealing of the baffle plates with respect to the front sides of the drum still has scraping or cutting elements which however, are technically well controlled. In the suspension retained between the rollers the coarse particles of solids on account of separation or decomposition steps drop directly in the area of the effective gap of the two drums and there are sucked up first on the filter surface, while the finer particles only later are sucked up. In this way, a bridge formation of the coarser particles of solids takes place and a sealing along the contactless effective gap of the two oppositely rotating filter drums. According to the composition of the suspension in each case, in this manner, effective gaps of appreciable width may be sealed without cutting or scraping sealing elements.

The construction according to the invention of the double drum filter permits further of a simple and very inexpensive type of construction, as comparable agitators for the suspensions are not necessary. Rather it is directly aimed at to make use of the separation or decomposition steps of the solid substance for the filtration process with the double drum filter according to the invention.

In development of the invention, it is provided that the baffle plates have sealing elements. By means of this measure, for the sealing of the baffle plates with respect to the front sides of the drum, advantageously exchangeable and adjustable sealing elements may be provided, which for example consisting of synthetic material, may provide a seal to a fargoing extent not subject to wear. It is suitable in this connection, that the sealing elements are formed as ring segments, which abut on the circumferential edges of the front sides of the drum. This is a particularly simple manner of construction, as for the purpose on the front side of the drum, solely a wearproof metal- or synthetic-material-ring is required to be laid, against which abut the sealing strips of the baffle plates in the manner of a covering, respectively.

In further embodiment of the invention, it is provided that at least one baffle plate has an overflow, whose overflow-opening is adjustable as to height. Hereby, the overflow level of the suspension collected between the drums and the baffle plates compensate for the different solids-substances, so that after or according to each composition of the suspension, on account of separation or decomposition steps, an optimal filtration process is attained. Suitable in this connection it is, that the overflow is arranged below the upper edges of the drum in the baffle plate. Hereby it is attained that in the case of non-uniform filter-charge, the drums are not flooded or submerged by the suspension to be filtered, but that the excess of suspension is reliably conveyed off and collected, and may be again conveyed to the filtration process.

In special embodiment of the invention, it is provided that underneath the filter drum and viewed in its direction of rotation, preferably behind the vertical center axis, in each case a removal device is arranged for the filter cake. In this way it is attained, that the filter cake is subsequently dehydrated over a very large circumferential area on the filter drum and therefore has a very low residual moisture. Suitably below the filter drum and above the removal device, a cleansing apparatus is arranged, preferably with cleaning nozzles. The filter tissue is hereby cleansed in constant operation of impurities occurring.

In development of the invention, it is provided that the cleaning nozzles are sealed with preferably rubber-elastic sealing strips. Hereby it is attained that from the cleansing apparatus no dripping water can escape, which moistens the filter cakes removed already below the cleansing apparatus, and can impair the filtration in uncontrollable manner. Suitably, the sealing strips lie in direction of rotation of the drum, viewed on their sleeve surfaces. In this manner, the wear on the sealing strips and the filter tissue is greatly decreased on the sleeve surfaces of the drum.

In preferred embodiment of the invention, it is provided that with cell-drum-filters, the cells of the one drum are correlated offset by a half cell width with the corresponding cells of the other drum. Through this measure, it is attained that eventual dripping water is immediately sucked down out of the linearly shaped effective gap between the filter drums from the vacuum already commenced below the effective gap, so that no dripping water may impair the filtration process.

In further development of the invention, it is provided that the distance of the cleansing apparatus from the removal device, viewed in direction of rotation of the drum, amounts to at least a cell-width. Hereby it is insured that the removal device for the filter cakes is so separated from the cleansing apparatus, that no cleaning liquid can reach the already dehydrated filter cakes.

In a preferred embodiment of the invention, it is provided that the distance or spacing of the drum axes is adjustable. Hereby a very good adaptation is attained to the types of suspension to be filtered, as according to the portion of the coarse solids substances in the suspension, the bridge formation in the effective gap between the filter drums is defined varyingly strongly, so that the effective gap may be optimally adapted to the particular portion of solids of the individual suspensions.

BRIEF DESCRIPTION OF THE DRAWINGS

The invention will be explained in greater detail on the basis of an example of an embodiment for a double-drum-filter according to the invention, from which further features and advantages are to be inferred.

In the drawings.

DESCRIPTION OF THE PREFERRED EMBODIMENTS

Figure 1:
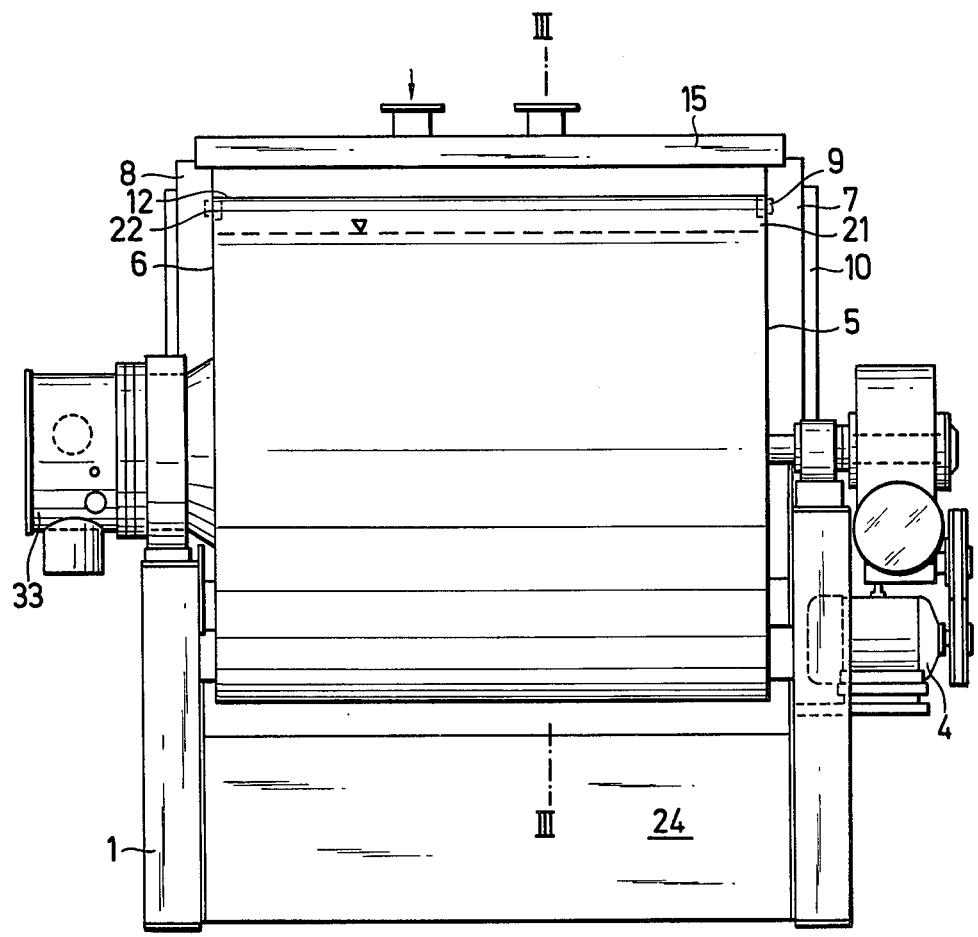
FIG. 1 shows the double drum filter in front view.
Figure 2:
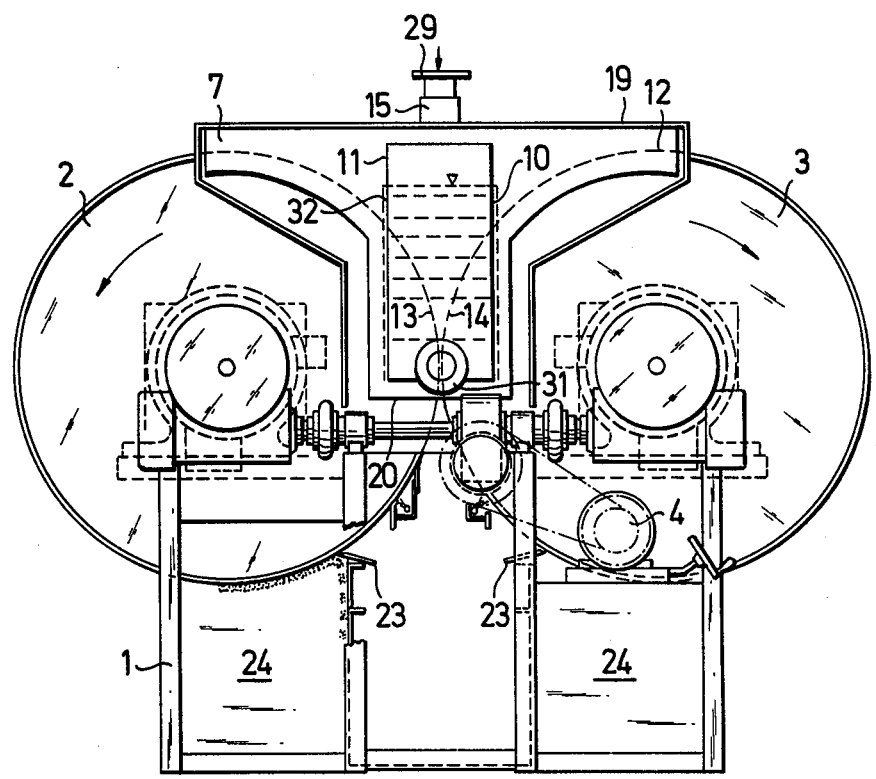
FIG. 2 shows the double drum filter in side view.
Figure 3:
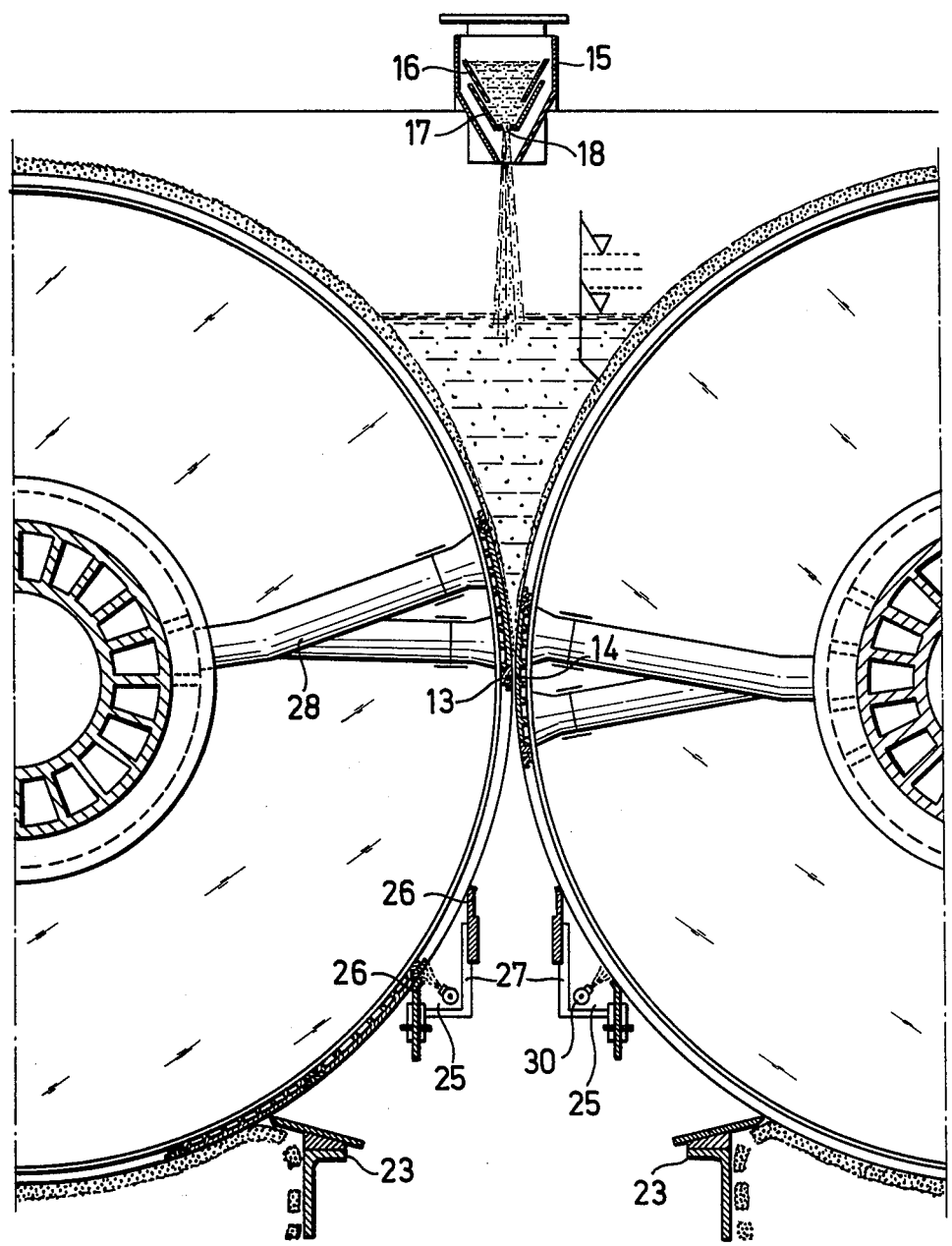
FIG. 3 shows a section through the double drum filter along the line III—III of FIG. 1, on an enlarged scale.

According to the showings in the figures, there are arranged in a carrier frame 1, two cell filter drums 2, 3 with parallel axes to one another, and they are, by means of a drive-unit 4, which is arranged on the carrier frame 1, offset in opposite rotational movements. On the front sides 5, 6 of the drum are arranged on both sides, baffle plates 7 and 8, which, provided with sealing elements 9 abut on the front sides of the drum. The baffle plates 7, 8 have a box-shaped overflow 10, whose overflow opening 11 for example is adjustable as to height by means of slidable sheet metal parts 32. The overflow, at least under the upper edges 12 of the drum is in open connection with the baffle plates 7, 8, and has an overflow conduit 31 arranged in the lower area through which the excess suspension is conveyed away from the filter and is later again supplied to the filtration process. The filter drums 2, 3 are inserted in the carrier frame 1 adjustably to one another and are so arranged that they are in effective connection with one another directly over their sleeve surfaces 13, 14, so that according to operative requirement, in the first place, a small gap is maintained between the drum sleeve surfaces, and in the second place, the drum sleeve surfaces may be hobbed linearly in contact with one another. To this end, the filter drums 2, 3 are slidably held on the carrier frame 1, for example through a dovetailed guide member, not shown in greater detail, and are in known manner fixedly arrested in their position by clamping strips.

Above the suspension tank limited by means of the drum sleeve surfaces 13, 14 downwardly and limited sidewards by the baffle plates 7, 8, is arranged in the center a charging box 15, in which is charged the suspension to be filtered. In the charging box 15, which extends beyond the entire drum-length, is disposed an inverted dispenser 16 which consists of two grooves 17 arranged superimposed with walls extending inclined downwardly and adjustable passage openings 18. With the aid of this inverted dispenser, the suspension to be filtered is charged uniformly into the suspension tank, and fluctuations in the charging of the suspension are equalized.

The suspension tank formed by the drum sleeve surfaces 13, 14 and the baffle plates 7, 8 is sealed in the floor or bottom area by means of the sleeve surfaces of the drum itself and by means of the particles of coarse solids of the charged suspension forming the filter cakes. The lateral sealing of the suspension tank takes place through the baffle plates 7, 8, whose upper edge terminates with a small spacing above the upper edge 12 of the drum and whose lower edge 20 begins shortly below the central axis of the drum. The front sides 5, 6 of the drum have collecting or sliding rings on the front edge 21 of the drum as circulating edges 22 against which the sealing elements 9 in the form of ring segments are pressed in the baffle plates 7, 8 and in which the sliding rings 22 correspond to the outer form. The sealing elements 9 may in this connection be adjusted through adjusting devices not described in greater detail, so that a connection secure against dripping exists between baffle plate 7, 8 and front wall 5, 6 of the drum. The adjusting device is preferably constructed so that the sealing elements 9 lie on an elastic body filled with hydraulic liquid, air or the like, to which upon greater wear of the sealing elements, more pressure liquid is supplied, so that a simple adjustment takes place and the conditions for a connection secure against dripping may be maintained in every condition of operation. Furthermore, it is insured that on the sealing elements a uniform sealing pressure is applied.

Underneath the filter drums 2, 3 and viewed in their direction of rotation, behind their vertical central axes is arranged a removal device 23, preferably a doctor blade or scraper for the filter cakes. Underneath the removal device 23 is arranged a collector tank 24 constructed open upwardly, for the filter cakes. Underneath the linearly shaped effective connection of the sleeve surfaces 13, 14 of the filter drums 2, 3 and above the removal device 23 is arranged a cleansing apparatus 25 which contains preferably flat-spray-nozzles 30, which extend over the entire length of the drum and are sealed by rubber-elastic sealing strips 26 with respect to the surroundings. These sealing strips lie in direction of rotation of the drum, viewed on the sleeve surfaces 13 and 14. The cleaning nozzles themselves are arranged in a metal housing 27 which has on the back side openings not shown in greater detail, which preferably are covered with rubber flaps, so that the nozzles are at all times accessible for technical inspection. The spacing of the cleansing apparatus 25 from the removal device 23 amounts—viewed in direction of rotation of the drum, to at least one cell width.

In the double drum filter shown with individual funnel-shaped suction cells, there extends through each cell starting with the middle of the drum, a forked suction pipe 28. The cell of the filter drum 2 is in this way correlated offset a half cell width with the corresponding cell of the drum 3, so that the vacuum commences already below the sealing effective gap of the filter drums 2, 3.

In operation, the suspension to be filtered in the charging boxes 15 is conveyed to the double drum filter shown through several charging openings 29 and into the suspension channels 17, which are arranged superimposed and travel downwardly inclined to their channel wall, and are limited by adjustable passage openings 18. These channels or grooves extend over the entire length of the drum, so that the suspension without separating upon charging may flow in uniformly into the suspension tank formed by the sleeve surfaces 13, 14 of the drum and the baffle plates 7, 8.

In the suspension tank takes place a separation or decomposition of the solid substances in the suspension according to the equal-settling-principle, so that the larger and heavier particles preferably settle or deposit there where the sleeve surfaces 13, 14 of the filter drums are in effective connection with one another. Through constant bridge-formation of the coarse solid substances, there takes place in this area a sealing of the suspension tank downwardly, simultaneously these coarser particles of solids on the sleeve surfaces 13, 14 of the drum are sucked against the filter tissue, while the finer particles of solids of the suspension first during the further rotation of the drum are sucked through the suspension and deposit on the coarser layer of solids. The filtrate is sucked down through the filter cake forming and the filter tissue through into the interior of the drums 2, 3 and drawn off through the control heads 33 from the drums. The filter cake adhering to the sleeve surface of the drum is pushed out of the suspension tank and redehydrated, whereby air is sucked through the pores of the filter cake, so that the last adhering particles of liquid are taken along, until the filter cake through further rotation of the filter drum reaches the lower drum area and there through the removal device 23 is removed from the drums and collected in the collection tank 24. The filter tissue freed from the filter cake is then rotated in the area of the cleansing apparatus 25, where out of flat spray-nozzles 30 which extend over the entire length of the drum —cleaning liquid under pressure is sprayed on the tissue. The filter tissue freed from the residues of solids then rotates out of the area of the cleansing apparatus and reaches the suspension tank, where the filter cake forms anew.

In order to collect dripping water issuing from the effective gap between the sleeve surfaces 13, 14 of the drum, the cells of the drum 2 are correlated offset a half cell width with the corresponding cell of the drum 3, so that the vacuum sets in before entry of the cell in the suspension tank, and eventual leakages in the suspension may immediately be sucked up.

If during the operation of the double drum filter shown, the charging suspension should alter greatly in its composition, whereby the portion of the coarse particles of solids increases, the filter drums may be pushed apart through the adjusting device not shown in greater detail, so that the particles of solids in the effective area of the sleeve surfaces of the drum form a corresponding solidsObridge, and seal the suspension tank towards the bottom. In this manner, the filter tissue may be protected and the filtration process as a whole enhanced. On the other hand, it may be found necessary to offset the filter drums 2, 3 with respect to one another, in case during the operation, the portion of coarser solids particles in the charged suspension becomes less. The double drum filter according to the invention therefore permits of being used preferably with suspensions of particles of solids with very wide granular bond.

I claim:

1. A double drum filter assembly comprising:
    a pair of oppositely rotating foraminous surfaced drums, means for adjusting the spacing between the drum axes, the foraminous surfaces being spaced to provide a slight gap therebetween which is capable of being bridged by solid particles from the suspension being filtered, and
    baffle plates connecting the faces of said drums together,
  whereby said drums retain a constant operating diameter as filtration proceeds and the deposited particles form a seal between said drums.

* * * * *